United States Patent [19]

Agarwal et al.

[11] Patent Number: 5,216,048

[45] Date of Patent: Jun. 1, 1993

[54] EMULSION-TYPE ADHESIVE COMPOSITIONS

[75] Inventors: Pawan K. Agarwal, Bridgewater; Allen C. Werner, Chatham; Donald N. Schulz, Annandale; Jeffrey Kaladas, S. Bound Brook, all of N.J.

[73] Assignee: Exxon Research & Engineering Company, Florham Park, N.J.

[21] Appl. No.: 489,624

[22] Filed: Mar. 7, 1990

[51] Int. Cl.$^5$ ............................................. C08L 95/00
[52] U.S. Cl. .................................. 524/60; 524/66; 524/547
[58] Field of Search ....................... 524/60, 66, 547

[56] References Cited

U.S. PATENT DOCUMENTS 3,687,886  8/1972  Distler et al. .................... 526/287
4,387,172  6/1983  Agarwal et al. .................. 524/60
4,560,710 12/1985  Schulz et al. .................... 523/175

Primary Examiner—Joseph L. Schofer
Assistant Examiner—R. H. Delmendo
Attorney, Agent, or Firm—Richard E. Nanfeldt; Joseph J. Dvorak

[57] ABSTRACT

This invention relates to emulsion-type adhesive compositions which include a copolymer of a conjugated diene and sulfopropyl-N-methacroyloxyethyl-N,N-dimethyl ammonium betaine, wherein the sulfobetaine copolymer has about 0.15 to about 15 mole % sulfobetaine groups per 100 grams of the neutralized sulfonated copolymer, and less than about 250 parts by weight of a hydrocarbon resin of a petroleum or coal tar distillate, having about 5 to 6 carbon atoms, the hydrocarbon resin being composed of aliphatic dienes and mono-olefins per 100 parts by weight of the neutralized sulfonated copolymer.

3 Claims, No Drawings

EMULSION-TYPE ADHESIVE COMPOSITIONS

BACKGROUND OF THE INVENTION

1. Field of the Invention

This invention relates to emulsion-type adhesive compositions which includes a copolymer of isoprene and sulfopropyl-N-methacroyloxyethyl-N,N-dimethyl ammonium-betaine, wherein the sulfobetaine copolymer has about 0.15 to about 15.0 mole % of sulfobetaine groups, and less than about 300 parts by weight of a hydrocarbon resin of a petroleum or coal tar distillate, having about 5 to 6 carbon atoms, the hydrocarbon resin being composed of aliphatic dienes and mono-olefins per 100 parts by weight of the sulfobetaine copolymer.

Broadly speaking, synthetic adhesives used in packaging can be classified into four categories: water-based emulsion system, solvent-based, reactive and hot melt adhesives. Of these four, currently the water-based are used most extensively. Usually the water based adhesives are based on emulsion polymers and are applied to porous cellulosic substrates. Energy from the outside in some fashion is applied to the system to evaporate the water in order that a strong bond may be formed.

With the solvent-based adhesives, usually a good wetting is achieved; however, their use has been becoming extremely restrictive due to expensive energy requirements for the evaporation of organic solvents, fire hazards associated with the use of these organic solvents and emissions problems with said solvents. The strict governmental regulations and restrictions concerning workers' exposure to solvent vapors, etc. has placed extra pressure on the packager to use non-solvent-based adhesives.

The hot melt adhesives are generally applied (as the name implies) by conventional extrusion or coating techniques in the temperature range of 250° to 450° C. on one of the surfaces to be bonded. The other surface is brought in contact with the hot surface for a sufficient period of time for the melt to cook, where, upon solidification, a strong and durable bond is formed.

As a result of various local and federal safety and environmental regulations, the polymers adhesive industry is moving from solvent- to water-based technology. Usually the water-based pressure-sensitive adhesives are based on emulsion polymers and applied to porous cellulosic substrates. Energy is applied to the system to evaporate the water in order to form a strong bond. The key requirement of such an emulsion is that it forms a uniform coating having good adhesive (tack) and cohesive characteristics. The degree of the adhesive and cohesive strength of the final adhesive product is established by its end use. For example, for general label applications, it is desired that the product have aggressive tack and not so much cohesive strength. However, for general tape uses, the composition should have good cohesive strength with marginal tack properties.

Currently in the market, there are very limited emulsion polymers available for water-based adhesives. A few acrylic polymer emulsions are available which are suitable for label applications, but these are relatively expensive. There is not a single water-based polymeric adhesive available in the market which meets the requirements for tape applications, especially the tapes desired by the automotive painting industry.

2. Prior Art

Several U.S. patents have described sulfonated polymers such as sulfonated butyl and sulfonated EPDM in adhesive applications (e.g., U.S. Pat. No. 3,867,247 and U.S. Pat. No. 3,801,531). It is important to distinguish the instant invention over those prior art systems. The former patents are directed at a sulfonated butyl cement or EPDM terpolymer which is solvent based and is employed to laminate various substrates. It is important to note that the instant invention differs dramatically from these patents as follows:

(a) The adhesives of the instant invention are not deposited from solvents, but are water-based emulsions;

(b) The instant invention may optionally include either a tackifier resin and/or plasticizer capable of associating with the neutralized sulfonate groups.

(c) The instant invention is directed to sulfobetaine elastomeric copolymers, whereas most of the prior art deals with sulfonated butyl rubber (e.g., U.S. Pat. No. 3,867,247).

There are a limited number of water based (emulsion) polymers which have reportedly given good adhesive and strength properties when mixed with appropriate resins. One class is the acrylics but these suffer the aforementioned disadvantages. Another example is a copolymer of isoprene and sodium styrene sulfonate (ISS) Agarwal et al. U.S. Pat. No. 4,387,174. However, the latter polymers can experience difficulties with emulsion stability and/or solids level, incorporation of sulfonate groups and (when mixed with appropriate resins) irreproducible of property profiles.

SUMMARY OF THE INVENTION

This invention relates to emulsion-type adhesive compositions which include a copolymer of a conjugated diene and sulfopropyl-N-methacroyloxyethyl-N,N-dimethyl ammonium betaine which has about 0.15 to about 15.0 mole of sulfobetaine groups, less than about 300 parts by weight of a hydrocarbon resin of a petroleum or coal tar distillate having about 5 to about 6 carbon atoms, said hydrocarbon resin having aliphatic dienes and mono-olefins therein per 100 parts by weight of the sulfobetaine copolymer and, optionally, about 1 to 75 parts of an ionic preferential plasticizer per 100 parts of the sulfobetaine copolymer can be added to the composition.

GENERAL DESCRIPTION

The present invention relates to unique and novel emulsion-type adhesive compositions which comprise a mixture of a sulfobetaine copolymer of a conjugated diene and sulfopropyl-N-methacroyloxyethyl-N,N-dimethyl ammonium betaine and a hydrocarbon resin, wherein to the compositions can be optionally added an ionic preferential plasticizer, oil, and/or a filter, thereby modifying the properties of the emulsion-type adhesive compositions.

SULFOBETAINE POLYMER AND PROCESS FOR FORMING

The solid copolymer of the instant invention comprises at least 85 mole % of at least one conjugated diene having from 4 to 12 carbon atoms and at least 0.15 mole % of sulfopropyl-N-methacroyloxyethyl-N,N-dimethyl ammonium betaine. The copolymer is water-insoluble having at least 0.5 weight percent sulfur to less than about 8 weight percent sulfur chemically combined.

The instant invention relates to the formation of emulsions of sulfobetaine-containing copolymers which are formed by a free radical copolymerization process. The monomers used in the free radical emulsion copolymerization processes are conjugated dienes which are copolymerized with a sulfobetaine-containing monomers.

In general, the conjugated diene and the sulfobetaine-containing monomer are dispersed in a water phase in the presence of a water-soluble initiator or a redox system which has one component soluble in the oil phase and one component soluble in the water phase, and either with or without surfactant, wherein the temperature is sufficient to initiate polymerization. To the resultant latex is added a tackifier resin and the emulsion is doctor bladed onto a substrate and dried at room or elevated temperature to form the adhesive film.

The copolymers formed from the free radical emulsion copolymerization process of the instant invention can be generally described as having a reduced viscosity (0.4637 g/dl of about 0.3 to about 3.0, more preferably about 0.5 to about 2.0. The copolymers of the instant invention contain about 0.5 to about 8 weight percent of the chemically combined sulfur, more preferably about 0.75 to about 6, and most preferably about 1.0 to about 3 weight percent sulfur. The copolymers of the instant invention are water insoluble (but water emulsifiable), substantially gel free, thermally stable and oxidatively stable. Stable emulsions of the instant sulfobetaine polymers can be made. Typically, the copolymerization of any conjugated diene as so defined herein can be readily copolymerized with the sulfobetaine-containing monomer as is defined herein. Terpolymers with styrene, acrylonitrile, vinyl chloride, as the termonomers with the aforementioned dienes, are also contemplated provided that no more than 5 mole percent of the termonomer is combined therein.

CONJUGATED DIENES

The conjugated dienes of the instant invention are generally defined as acyclic conjugated dienes containing from about 4 to about 10 carbon atoms, more preferably about 4 to about 6 carbon atoms. Typical, but non-limiting, examples of acyclic conjugated dienes are 1,3-butadiene, isoprene (2-methyl-1,3-butadiene), 2,3-dimethyl, 1,3-pentadiene, 2-methyl-1,3-pentadiene, 2,3-dimethyl-1,3-pentadiene, 3-methyl-1,3-pentadiene, 2-phenyl butadiene, chloroprene and piperidene having about 4 to about 12 carbon atoms. Typical, but non-limiting, examples of cyclic conjugated dienes are cyclopentadiene and methyl cyclopentadiene. The preferred conjugated dienes of the instant invention are selected from the group consisting of 1,3-butadiene, isoprene and chloroprene In the formation of the sulfonate-containing copolymer, one copolymerizes one of the aforementioned conjugated dienes with the sulfobetaine-containing monomer. Sulfobetaine-containing terpolymers can be readily formed by copolymerizing the sulfobetaine-containing monomer with a mixture of two of the above-identified conjugated dienes.

Alternatively, other co or terpolymers of vinyl monomers such alkyl acrylates or methacrylates, or alkyl acrylate amides having about 4 to about 12 carbon atoms could be copolymerized with sulfonate containing monomers.

SULFOBETAINE-CONTAINING MONOMERS

The sulfobetaine-containing monomers of the instant invention which are water soluble are sulfopropyl-N-methacroyloxyethyl-N,N-dimethyl ammonium betaine. The mole % of sulfobetaine-containing monomer in the copolymer is about 0.15 to about 15.0, more preferably about 1.0 to about 10.0, and most preferably about 2.0 to about 5.0. Either a water-soluble, free radical initiator such as potassium persulfate, ammonium persulfate, water-soluble redox couples such as potassium persulfate, sodium metabisulfite or oil-soluble, water-soluble redox couples such as diisopropyl benzene hydroperoxide, triethylenetetramine are effective in initiating these copolymerizations. The water-soluble inorganic systems are preferred because of an apparent reduction of side reactions with the resulting unsaturated polymer.

The surfactants employed for this invention are varied and well known in the art. The typical emulsifiers or surfactants can be employed; however, some are more effective than others in generating latexes of better stability. A preferred emulsifier is sodium lauryl sulfate. This copolymerization can also be conducted without emulsifier because of the surfactancy of the sulfobetaine monomer.

Buffering agents can be employed in the instant polymerization process and are selected from the group consisting of sodium carbonate, ammonia, sodium acetate, trisodium phosphate, etc. When utilized, these buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfobetaine-containing monomer and the conjugated diene.

The free radical emulsion copolymerization of the water-soluble sulfobetaine-containing polymer and the conjugated diene yields a stable latex, wherein the resultant water-insoluble copolymer is not covalently cross-linked and possesses substantial ionic cross-linking, and has about 0.5 to about 8.0 weight percent of chemically combined sulfur, more preferably about 1.0 to about 3 0. To the resultant latex is added the tackifier resin to form the emulsion-type adhesive composition.

COMMERCIAL TACKIFIER RESINS

To the emulsion of the metal-neutralized sulfonated elastomeric copolymer is added a commercial tackifying resin having a softening point of about 0° C. to about 160° C., more preferably about 50° C. to about 140° C. and most preferably about 70° C. to 120° C. A variety of commercial tackifier resins are available. Some of these resins contain $\alpha$ and/or $\beta$ pinene or rosin derivatives as the base ingredient, while others are derived from the polymerization of petroleum or coal distillates which consist of aliphatic dienes, mono- and di-olefins and cyclic olefins having about 5 to about 6 carbon atoms. The latter type of tackifiers have primarily piperyline and/or isoprene structure. A general but excellent description of tackifying resins derived from petroleum derivatives can be found in, for example, *Encyclopedia of Polymer, Science and Technology*, Vol. 9, pages 853 to 860, chapter by John Findlay, published by John Wiley & Sons, New York (1968).

Typical but non-limiting tradenames of these commercial tackifiers are Wingtack of Goodyear, Escorez of Exxon, Piccolyte of Hercules and Zonrez of Arizona Chemicals. Recently, these and various other companies have also started marketing relatively higher softening point resins. These are generally modified aliphatic hydrocarbon resins and/or hydrogenated polycyclics. The physical appearance of these commercial tackifying resins varies, depending upon their softening point; they can be either viscous liquids or light-colored solids at room temperature. Most often, their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous, the number average molecular weight $M_n$, as measured by GPC, can be from about 300 to about 5,000 and more preferably about 500 to about 2,000, and most preferably about 700 to 1,600.

As well known to those familiar with the use of tackifying resins because of their wide range compatibility, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the emulsion-type adhesive composition at about 20 to about 250 parts by weight per 100 parts by weight of the sulfobetaine copolymer, more preferably about 25 to about 200, and most preferably about 50 to about 150.

In forming the emulsion-type adhesive composition of the sulfobetaine elastomeric copolymer, the tackifier resin is dissolved in a hydrocarbon solvent such as toluene at a concentration level of about 1 to about 50 grams per 100 ml. of solvent, for example 10 grams. The solution of tackifier resin is added to the emulsion of the sulfobetaine copolymer and vigorously mixed to form the emulsion-type adhesive composition.

PREFERENTIAL PLASTICIZER

An emulsion of a preferential (ionic) plasticizer can be added to the emulsion of the copolymer of a conjugated diene and sulfopropyl-N-methacryloxyethyl-N,N-dimethyl ammonium betaine and the hydrocarbon tackifying resin.

The preferential plasticizer is selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Periodic Table of Elements and mixtures thereof. The carboxylic acids are selected from the group consisting of lauric, myristic, palmitic, or stearic acids and mixtures thereof; e.g., zinc stearate, magnesium stearate, or zinc laurate.

The preferential plasticizer is incorporated into the adhesive composition at about 1 to about 75 parts by weight based on 100 parts by weight of the copolymer, more prefereably at about 7 to about 50, and most preferably at about 10 to about 30. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof.

METHOD OF APPLICATION

The emulsion of the sulfobetaine elastomeric copolymer is doctor bladed to the required thickness onto a substrate and the formed adhesive film is dried at room temperature or elevated temperature either under vacuum or at atmospheric pressure for a sufficient period of time in order to remove the water from the adhesive film.

Most preferably the drying or fusion temperature of the emulsion layer of the neutralized sulfonated elastomeric copolymer and the hydrocarbon tackifying resin is about 50° to about 250° C. and the time of drying or fusion is about 10 seconds to 10 minutes, wherein the drying or fusion is preferably conducted at the temperature of greater than 50° C. for at least 30 seconds. The thickness of the adhesive layer formed by the drying or fusion of the emulsion layer of the sulfobetaine elastomeric copolymer and the hydrocarbon tackifying resin is about 0.1 mil. to 10 mil. Typical substrates, upon which the emulsion layer can be deposited on one or both of the surfaces of the substrate to form an article such as a pressure-sensitive tape, are plasticized polyvinylchloride, mylar, cellulose acetate, polyethylene, polypropylene and paper.

DETAILED DESCRIPTION OF THE PREFERRED EMBODIMENTS

As exemplified in the following illustrative examples, a series of emulsion-type adhesive compositions were prepared.

EXAMPLES

EXAMPLE 1

A copolymer emulsion of isoprene and sulfopropyl-N-methacroloxyethyl-N,N-dimethyl ammonium betaine (SPE) was prepared as follows: 1.6 gms of sodium pyrophosphate $Na_4P_2O_7.10H_2O$, 10.6 gms of Na lauryl sulfate (dissolved in 266 gms of previously boiled, distilled $H_2O$), 106 gms of isoprene, 31.7 gms of SPE, 4.0 gms of tetraethylene pentamine and 4.0 gms of cumene hydroperoxide (flushed 10 minutes with $H_2O$) were charged in a large size soda bottle which had been previously purged with $N_2$. The reaction was allowed to proceed at room temperature, keeping the reaction bottle in a shaker bath for about 15 hours. At the end of this period, the product was white, stable emulsion. The solid contents of the emulsion was determined by drying a small known amount of the emulsion. This emulsion was found to have nearly 18.2% solids in it. The emulsion of this example was identified as sample 201-8A.

EXAMPLE 2

In this run 3.2 gms of sodium pyrosulfate, 21.2 gms of sodium lauryl sulfate (dissolved in 266 gms of boiled, distilled and cooled $H_2O$), 212 gms of isoprene, 63.4 gms of SPE, 8 gms of tetramethylene pentamine (TEPA) and 8 gms of cumene hydroperoxide (CHP) were charged in a reaction vessel and reaction proceeded as in Example 1. Since at the end of the reaction the emulsion smelled of isoprene, additional initiator, 5 gms each of TEPA and CHP were added again. The reaction was allowed to continue for another 15 hours. At the end of this time, a white, stable emulsion containing about 35.5% solids was obtained. This sample was identified as sample 201-15.

EXAMPLE 3

A control polyisoprene emulsion without any SPE monomer was desired and was obtained for this example. The reaction conditions and the quantities of all the ingredients, except SPE monomer, were identical to those of Example 1. It was found that the final product was not a stable emulsion. The color and the emulsion was light yellow-tan. The polymer glob was filtered, and the remaining emulsion was found to have about 31% solids. In spite of the poor quality of the emulsion, this was used as a control polymer for PSA application. The emulsion was identified as sample 201-8B.

EXAMPLE 3A

An additional series of polymers were prepared using the methods of Examples 1–3 and the amount of charged sulfobetaine monomer was compared with that amount of sulfobetaine uncorporated in the polymer, as judged by sulfur analysis.

| Sample No. | Mole % Sulfobetaine Charges | Mole % Sulfobetaine Incorporated | Reduce Viscosity |
|---|---|---|---|
| 201-16 | 6.8 | 2.65 | 0.96 |
| 201-17 | 4.6 | 1.91 | 1.19 |
| 201-18 | 13.0 | 6.32 | 0.78 |
| 201-19 | 0.0 | 0.0 | — |

EXAMPLE 4

In this example, various pressure-sensitive adhesive systems were prepared by blending the emulsions of copolymer PI-SPE described in the above examples with an emulsion of a petroleum tackifying resin. The resin emulsion used here for illustrative purposes was Escorez 1310 emulsion, manufactured by Exxon Chemical Company, U.S.A. Various blends of the copolymers and resins were made by gently mixing the emulsions with (50/50) dry ratio. The films were then drawn down on mylar papers using a doctor's blade. The films were then dried in an oven for 2 minutes at 100° C. Typical pressure-sensitive adhesive tests according to the industry standards, as specified by the Pressure Sensitive Tests Council, were performed. The following Table 1 shows the results obtained:

TABLE 1

| PSA EVALUATION OF COPOLYMERS OF PI-SPE AND F-1310 EMULSIONS | | | | | | |
|---|---|---|---|---|---|---|
| Sample | Rolling Ball Tack Cm. | Polyken Tack | 180° Peel Strength, PPI | 90° Quick Stick | Hrs, Hold to Steal | Comments |
| PI-SPE (201-8A; Example 1) + E-1310 | 5.2 | 444 | 3.4 | 1.7 | 1.4 | Excellent downdraw. Some adhesive transfer during peel. |
| PI-SPE (201-15; Example 2) + E-1310 | 30.0+ | 144 | 2.3 | 0.7 | 6.2 | Excellent downdraw. |
| PI (201-813; Example 3) + E-1310 [Control] | 30.0+ | 201 | 1.4 | 1.3 | 0.0 | Poor downdraw. Excessive adhesive transfer during peel. |

It is clear from the data presented in the above table that adhesives of sulfobetaine copolymers of PI-SPE have desired PSA properties while the control PI system does not perform to any degree of the required minimum values of either tack or cohesive properties.

What is claimed is:

1. A water-based emulsion composition for a pressure-sensitive adhesive which comprises a mixture of:
   (a) an emulsion of a diene and sulfobetaine copolymer having at least 85 mole % of at least one conjugated diene having from 4 to 12 carbon atoms and sulfopropyl-N-methacroyloxyethyl-N,N-dimethyl ammonium betaine; and
   (b) about 25 to about 250 parts by weight of a hydrocarbon tackifying resin based on a petroleum or coal tar distillate per 100 parts by weight of said copolymer.

2. An emulsion composition according to claim 1 wherein said conjugated diene is selected from the group consisting of 1,3-butadiene, isoprene and chloroprene and mixtures thereof.

3. An emulsion composition according to claim 1 wherein said conjugated diene is isoprene.

* * * * *